D. A. HAWLEY.
PISTON RING.
APPLICATION FILED JUNE 1, 1920.

1,408,087. Patented Feb. 28, 1922.

Inventor
D. A. Hawley
By H. B. Willson & Co.
Attorneys

UNITED STATES PATENT OFFICE.

DARREL A. HAWLEY, OF TOLEDO, OHIO.

PISTON RING.

1,408,087.

Specification of Letters Patent.  Patented Feb. 28, 1922.

Application filed June 1, 1920. Serial No. 385,808.

*To all whom it may concern:*

Be it known that I, DARREL A. HAWLEY, a citizen of the United States, residing at Toledo, in the county of Lucas and State of Ohio, have invented certain new and useful Improvements in Piston Rings; and I do declare the following to be a full, clear, and exact description of the invention, such as will enable others skilled in the art to which it appertains to make and use the same.

This invention relates to an improved piston ring which is especially, although not necessarily, designed for use on pistons of internal combustion engines.

An object of the invention is to provide a ring with an entirely new kind of a joint which is such that it will prevent all possibility of the free ends of the ring gouging into the walls of the cylinders as very often occurs with the types of rings now in use.

Another object of the invention is to provide a ring in which the joint is such that it will insure that the ring is a true circle, thus insuring that it will fit the wall of the cylinder as perfectly as is possible, consequently, guarding against possible leakage which is a fault evident in many rings now on the market.

Other objects and advantages of the invention will be apparent during the course of the following description.

In the accompanying drawings forming a part of this specification and in which like numerals are employed to designate like parts throughout the same:

Figure 1:
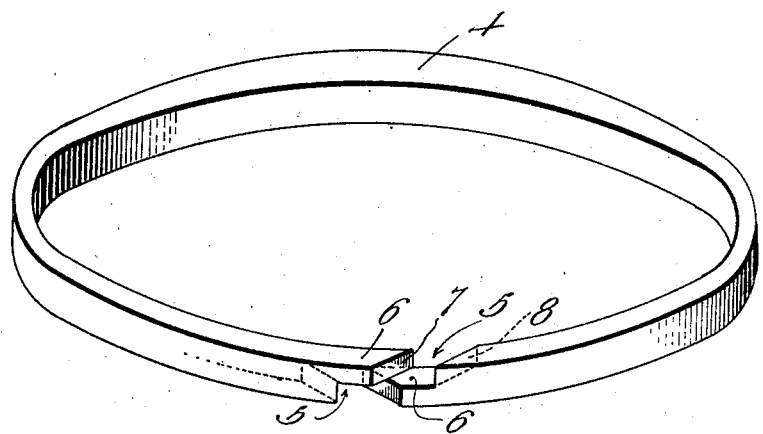
Fig. 1 is a perspective view of a piston ring constructed in accordance with my invention.
Figure 2:
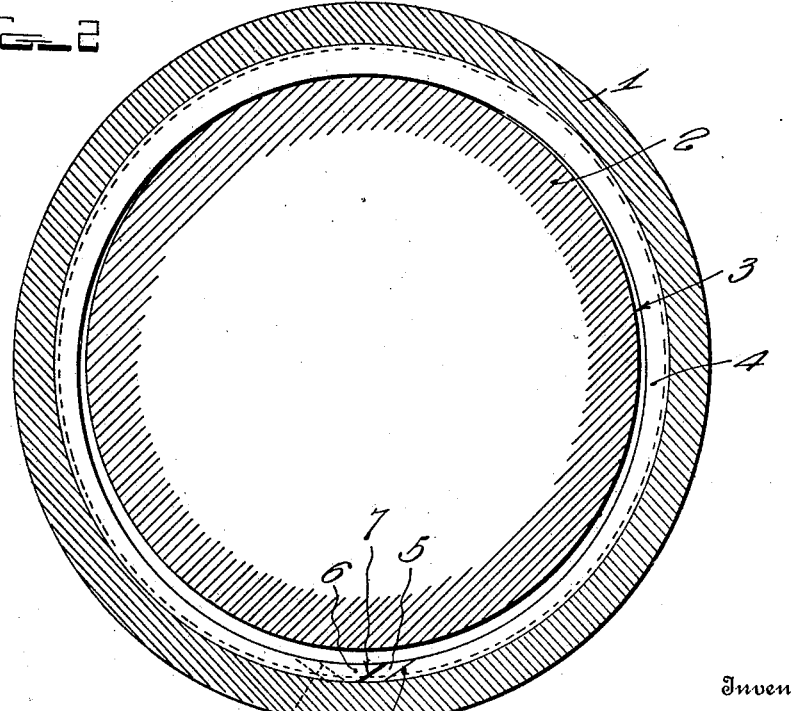
Fig. 2 is a view showing the ring applied on a piston.

In the drawings, wherein for the purpose of illustration is shown a preferred embodiment of my invention, the numeral 1 designates a cylinder in which the piston 2 reciprocates, the latter being provided with the usual grooves 3 in which the rings may be seated.

The ring is here designated by the numeral 4. With the exception of the new joint which I employ, this ring is of conventional construction. In carrying out my invention I notch the free ends of the ring on sides opposite to one another to provide a pair of recesses 5 and extensions 6, the latter being adapted to overlap one another and extend into the recesses, their combined thickness being equal to the thickness of the ring. The free end of each extension is bevelled inwardly from the outer surface of the ring as shown at 7, and the bevels of the respective extensions are inclined in directions opposite to one another. The inner ends of the recesses 5 are also bevelled as shown at 8, and these bevels are likewise inclined inwardly from the outer surface of the ring, or it may be said that these bevels are directed away from the extensions 6. With this construction it will be seen that the inner ends of the recesses and the free ends of the adjacent extensions are bevelled in directions opposite one another and opposite to the bevels of the corresponding parts. When the ring is in use, the beveled extremities 7 of the extensions 6 will abut the beveled walls 8 of the recesses 5 and prevent the free ends of the ring from moving laterally outward with respect to the axis of the piston and gouging into the wall of the cylinder as occurs with many of the rings now on the market due to the inferior joints with which they are provided.

With a ring constructed in accordance with my invention, it will be seen that the free ends of the ring cannot dig into the wall of the cylinder and destroy it. Also, due to the novel joint which I employ, the ring will at all times be a true circle, consequently, it will fit the wall of the cylinder perfectly and will prevent all possibility of leakage. Due to this novel joint, the free ends of the ring will be locked. To explain, it may be said that when the ends are jointed and pressed together, the tendency of the extremities to press outwardly and inwardly is entirely overcome. My ring also bears equally at all points against the cylinder wall, thus preventing it from wearing the cylinder wall as other rings do. It will also be noted that the peculiar joint of my ring will divert the points of the ring away from the cylinder wall, and will prevent breakage of the extensions already referred to. My ring is simple, and may be manufactured and sold at a small price.

Careful consideration of the foregoing description taken in conjunction with the accompanying drawings will enable persons skilled in the art to which this invention appertains, to obtain a clear understanding of the same, therefore, further description is deemed unnecessary.

I claim:

A one piece piston ring having parallel sides at right angles to its axis, said ring being centrally split throughout a short portion of its circumference in a plane parallel to said parallel sides, being transversely split in a single plane from one end of said short circumferential split to one of said parallel sides, and being transversely split in a single plane from the other end of said circumferential split to the other of said parallel sides, said transverse splits being disposed at right angles to said circumferential split and at substantially right angles to each other and diverging throughout their lengths from the outer to the inner periphery of the ring, whereby to form obtuse angular outer corners on the ends of the ring having no tendency to snap off or to score the cylinder wall.

In testimony whereof I have hereunto set my hand.

DARREL A. HAWLEY.